Figure 1:
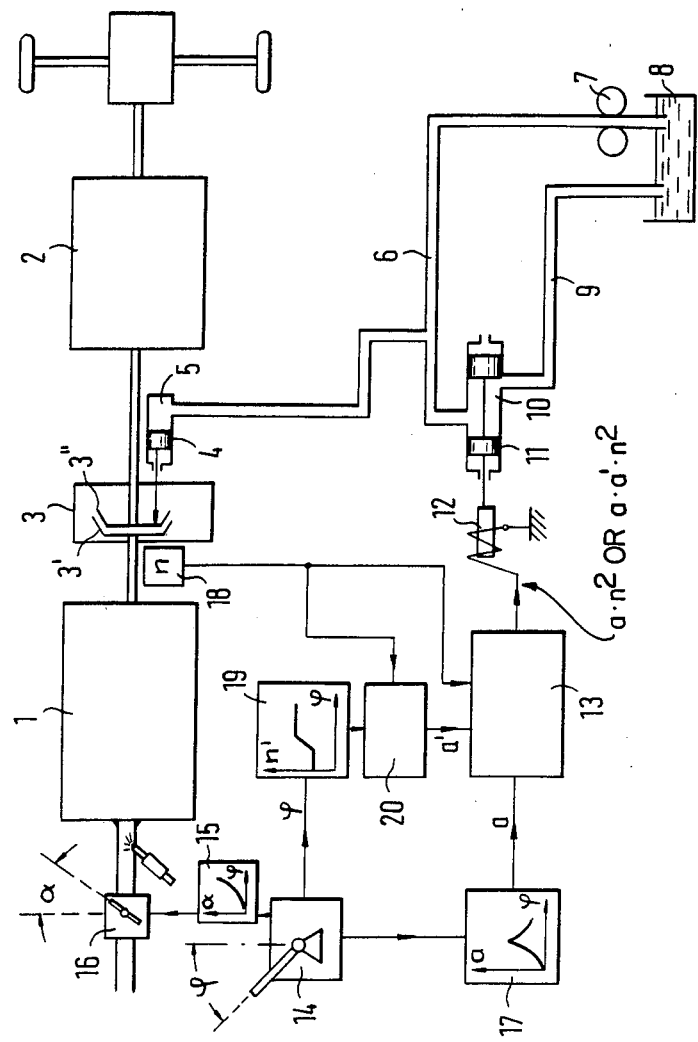

United States Patent [19]

Bofinger et al.

[11] Patent Number: 4,553,654
[45] Date of Patent: Nov. 19, 1985

[54] INSTALLATION FOR CONTROLLING A CLUTCH IN RESPONSE TO DRIVE PEDAL POSITION AND ENGINE SPEED

[75] Inventors: Gerd Bofinger, Stuttgart; Norbert Stelter; Rainer Wüest, both of Weissach, all of Fed. Rep. of Germany

[73] Assignee: Dr. Ing. h.c.F. Porsche AG, Fed. Rep. of Germany

[21] Appl. No.: 475,727

[22] Filed: Mar. 16, 1983

[30] Foreign Application Priority Data

Mar. 17, 1982 [DE] Fed. Rep. of Germany ....... 3209645

[51] Int. Cl.[4] .............................................. B60K 41/02
[52] U.S. Cl. ................................................ 192/0.076
[58] Field of Search ............... 192/0.076, 0.075, 0.052, 192/0.096, 0.032, 3.58, 103 R; 361/242, 243; 74/866

[56] References Cited

U.S. PATENT DOCUMENTS

| 4,401,200 | 8/1983 | Heidemeyer et al. | 192/0.076 |
| 4,438,664 | 3/1984 | Fiala | 74/866 |
| 4,481,844 | 11/1984 | Ironside et al. | 74/866 |

Primary Examiner—George H. Krizmanich
Attorney, Agent, or Firm—Craig and Burns

[57] ABSTRACT

An installation for the control of a motor vehicle drive unit which includes a reciprocating piston engine, a hydraulically actuated clutch and a transmission. A drive pedal pick-up controls the throttle valve and therewith the engine torque by way of a first characteristic curve converter while it applies a signal by way of a second characteristic curve converter a to a control apparatus, to which is also fed at the same time the engine rotational speed n. The control apparatus forms the product $a \cdot n^2$ and applies the same as output signal to the electromagnetic actuating mechanism of the hydraulic clutch so that the pressure thereof and also the torque in the clutch is proportional to the product $a \cdot n^2$.

16 Claims, 2 Drawing Figures

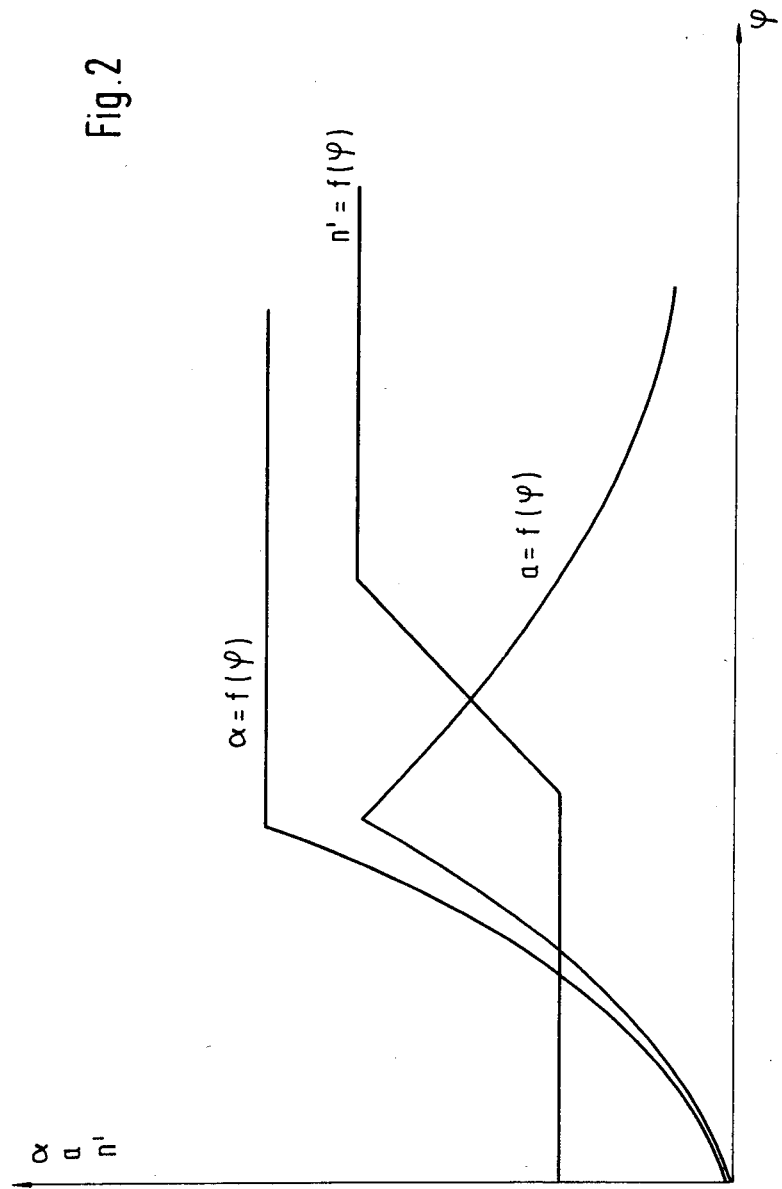

INSTALLATION FOR CONTROLLING A CLUTCH IN RESPONSE TO DRIVE PEDAL POSITION AND ENGINE SPEED

The present invention relates to an installation for the control of a motor vehicle drive unit which includes a reciprocating piston engine, a clutch and a transmission, and which is equipped with pick-ups and with an adjusting mechanism controlling the clutch.

An installation for the automatic actuation of a clutch arranged between an engine and a transmission is described in German Offenlegungsschrift No. 28 33 961, in which the force acting on the clutch is controllable as a function of the drive pedal position as well as of the rotational speeds measured in front and to the rear of the clutch by means of a pneumatic servo device acted upon by vacuum through a suction pipe. According to German Offenlegungsschrift No. 29 06 587, this servo device is to respond additionally to the second derivative of these rotational speeds with respect to time in order to utilize the jerk or jolt occurring during the engagement of the clutch for the control of the clutch engagement.

Starting with these known installations, the task of the present invention resides in so controlling a motor vehicle drive unit that driving is made possible thereby which is as jerk-free and as protective of the transmission as possible. For that purpose, the starting torque and the starting rotational speed have to be so chosen that as small as possible a power loss occurs at the clutch.

The present invention solves the underlying problems, in that a drive pedal pick-up for sensing the position of the drive pedal controls the throttle valve position of the engine and therewith the engine torque by way of a first characteristic curve converter, and in that the drive pedal pick-up applies a signal dependent on the drive pedal position by way of a second characteristic curve converter to a control apparatus, to which is also connected the engine rotational speed pick-up which produces a signal for the actuating mechanism of the clutch that is equal to the product of a $\cdot n^2$ so that the torque transmitted by the clutch is also proportional to $n \cdot n^2$. Since the torque transmitted in the clutch is proportional to the square of the engine rotational speed, the control installation according to the present invention is effective in a manner similar to centrifugal force clutches frequently used heretofore for the starting of the motor vehicle, whose torque also increases as the square of the rotational speed.

The advantage of the installation according to the present invention resides in that in contrast to the mechanically controlled centrifugal clutch, which operates with an engine rotational speed predetermined only by the mechanical system, the starting rotational speed can be predetermined by the drive pedal.

In the present invention, the engine torque is controlled by the drive pedal by way of a characteristic curve converter and an adjusting member for the throttle valve connected thereto. At the same time, the drive pedal position is fed to a second characteristic curve converter, whose output signal a is fed as input to the control apparatus. The product $a \cdot n^2$ is formed in the control apparatus, and is applied to the adjusting or actuating mechanism of the clutch. In this manner, the torque transmitted by the clutch is matched to the engine torque and is adjustable according to the square of the engine rotational speed. Accordingly, it is impossible for the engine to assume non-permissive rotational speeds as a result of the clutching operation. The exact control of the clutch torque enables a clutching operation which protects the materials of the respective parts.

These and further objects, features and advantages of the present invention will become more apparent from the following description when taken in connection with the accompanying drawing which shows, for purposes of illustration only, one embodiment in accordance with the present invention, and wherein:

FIG. 1 is a schematic block diagram of a control installation in accordance with the present invention; and FIG. 2 is a diagram illustrating the characteristic curves of the present invention used in connection with the different characteristic curve converters of the system of FIG. 1.

Referring now to the drawing, wherein like reference characters are used throughout the two views to designate corresponding parts, and more particularly to FIG. 1, a hydraulically actuated clutch 3 with its two friction disks 3' and 3" is arranged between a reciprocating piston engine 1 and a transmission 2 of a motor vehicle; the friction force of the friction disks 3' and 3" is applied by a hydraulic piston 4. The associated hydraulic cylinder 5 is connected to a hydraulic line 6 which is supplied by a pump 7 from a reservoir 8. For the pressure control, a pressure control valve 10 is installed between the hydraulic line 6 and a return line 9 to the reservoir tank 8; its control piston 11 is displaceable by an electromagnetic actuating device 12 which is connected to an electronic control apparatus 13.

A drive pedal pick-up or transmitter 14 for the position ($\phi$) of the drive pedal is connected with an adjusting member 16 for the throttle valve by way of a first characteristic curve converter 15 in which a characteristic curve: throttle valve angle $\alpha$ as a function of the drive pedal position $\phi$ is stored. Additionally, the drive pedal pick-up or transmitter 14 is connected to a second characteristic curve converter 17, in which a function $a = f(\phi)$ is stored, and which is connected with the control apparatus 13. Furthermore, a pick-up or transmitter 18 for the engine rotational speed is connected with the control apparatus 13. In a computer of the control apparatus 13, the product $a \cdot n^2$ is formed from the input magnitudes a and n and is applied as output magnitude to the electromagnetic actuating drive 12 for the pressure control valve 10 so that the pressure of the hydraulic line 6 and the torque adapted to be transmitted in the clutch 3 is equal to the product $a \cdot n^2$.

In order to be able to also take into consideration in the control the change of the friction value of the friction disks 3' and 3", a third characteristic curve converter 19 is connected to the drive pedal pick-up 14, which produces a reference characteristic curve $n' = f(\phi)$. Its output signal n' is fed to a comparator 20 which is connected with the rotational speed pick-up 18 and whose output signal a' is connected to the control apparatus 13.

The actual engine rotational speed is compared with this reference characteristic curve and in case of a deviation between n and n', which corresponds to a change of the friction value of the friction disks 3' and 3", the comparator 20 applies a signal a' to the control apparatus 13 which is used for the formation of the overall product so that the output signal of the control apparatus is equal to the product $a \cdot a' \cdot n^2$.

In lieu of the control apparatus 13, which is of any known construction, also a microprocessor of any known construction may be used in which the three characteristic curve converters are integrated as storage devices.

FIG. 2 illustrates the three characteristic curves of the three characteristic curve converters 15, 17 and 19. The characteristic curve $\alpha = f(\phi)$ stored in the first characteristic curve converter 15 rises approximately parabolically in the lower region and extends parallelly to the $\phi$-axis in the upper region. A function $a = f(\phi)$ is stored in the second characteristic curve converter 17 which includes an approximately parabolically rising branch and an approximately hyperbolically decreasing branch. The signal for a characteristic reference curve $n' = f(\phi)$ is produced by the third characteristic curve converter 19, whereby the characteristic reference curve $n' = f(\phi)$ extends substantially parallelly to the $\phi$-axis in the lower region, then rises approximately linearly and extends again substantially parallelly to the $\phi$-axis in the upper region.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for control of a motor vehicle drive unit having a reciprocating piston engine, clutch means and a transmission, comprising pick-up means for sensing engine rotational speed (n), an actuating means for operatively controlling the force acting on the clutch means, a drive pedal pick-up means for sensing a position of a drive pedal, said drive pedal controlling throttle valve position of the engine and therewith the engine torque by way of a first characteristic curve converter means, the drive pedal pick-up means applying a signal (a) dependent on the sensed drive pedal position by way of a second characteristic curve converter means to a control means, said control means being operatively connected to the rotational speed pick-up means, and said control means being operable to produce a signal for the actuating means of the clutch means which is equal to the product $a \cdot n^2$ so that torque transmitted by the clutch means is substantially proportional to $a \cdot n^2$.

2. An installation according to claim 1, wherein a function $a = f(\phi)$ is stored in the second characteristic curve converter means, which is composed of an approximately parabolically rising branch and of an approximately hyperbolically decreasing branch.

3. An installation according to claim 2, wherein the signal of the engine rotational speed (n) is compared with a signal produced by a third characteristic curve converter means for a reference characteristic curve $n' = f(\phi)$, and the deviation between reference rotational speed (n') and measured rotational speed (n) is applied to the control means as further characteristic magnitude (a') so that the output signal of the control means is equal substantially to the product $a \cdot a' \cdot n^2$.

4. An installation according to claim 3, wherein the characteristic reference curve $n' = f(\phi)$ extends substantially parallelly to the $\phi$-axis in the lower region thereof, then rises approximately linearly and extends again substantially parallelly to the $\phi$-axis in the upper region thereof.

5. An installation according to claim 4, wherein the characteristic curve $\alpha = f(\phi)$ which is stored in the first characteristic curve converter means rises approximately parabolically in the lower region thereof and extends substantially parallelly to the $\phi$-axis in the upper region thereof.

6. An installation according to claim 5, wherein an hydraulically actuated clutch means is arranged between the engine and transmission, whose static pressure (p) is controlled by the control means according to the function $p = a \cdot n^2$.

7. An installation according to claim 6, with a performance graph means in lieu of the first characteristic curve converter means, which controls the throttle valve position $\alpha$ in dependence on the drive pedal position $\phi$ and the engine rotational speed (n) in such a manner that with a constant drive pedal position $\phi$, the engine driving torque remains constant.

8. An installation according to claim 7, wherein said performance graph means is a performance graph storage means.

9. An installation according to claim 7, wherein the performance graph means is a performance graph converter means.

10. An installation according to claim 1, wherein the signal of the engine rotational speed (n) is compared with a signal produced by a third characteristic curve converter means for a reference characteristic curve $n' = f(\phi)$, and in that the deviation between reference rotational speed (n') and measured rotational speed (n) is applied to the control means as further characteristic magnitude (a') so that the output signal of the control means is equal substantially to the product $a \cdot a' \cdot n^2$.

11. An installation according to claim 10, wherein the characteristic reference curve $n' = f(\phi)$ extends substantially parallelly to the $\phi$-axis in the lower region thereof, then rises approximately linearly and extends again substantially parallelly to the $\phi$-axis in the upper region thereof.

12. An installation according to claim 1, wherein the characteristic curve $\alpha = f(\phi)$ which is stored in the first characteristic curve converter means rises approximately parabolically in the lower region thereof and extends substantially parallelly to the $\phi$-axis in the upper region thereof.

13. An installation according to claim 1, wherein an hydraulically actuated clutch means is arranged between the engine and transmission, whose static pressure (p) is controlled by the control means according to the function $p = a \cdot n^2$.

14. An installation according to claim 1, with a performance graph means in lieu of the first characteristic curve converter means, which controls the throttle valve position $\alpha$ in dependence on the drive pedal position $\phi$ and the engine rotational speed (n) in such a manner that with a constant drive pedal position $\phi$, the engine driving torque remains constant.

15. An installation according to claim 14, wherein said performance graph means is a performance graph storage means.

16. An installation according to claim 14, wherein the performance graph means is a performance graph converter means.

* * * * *